Figure 1:
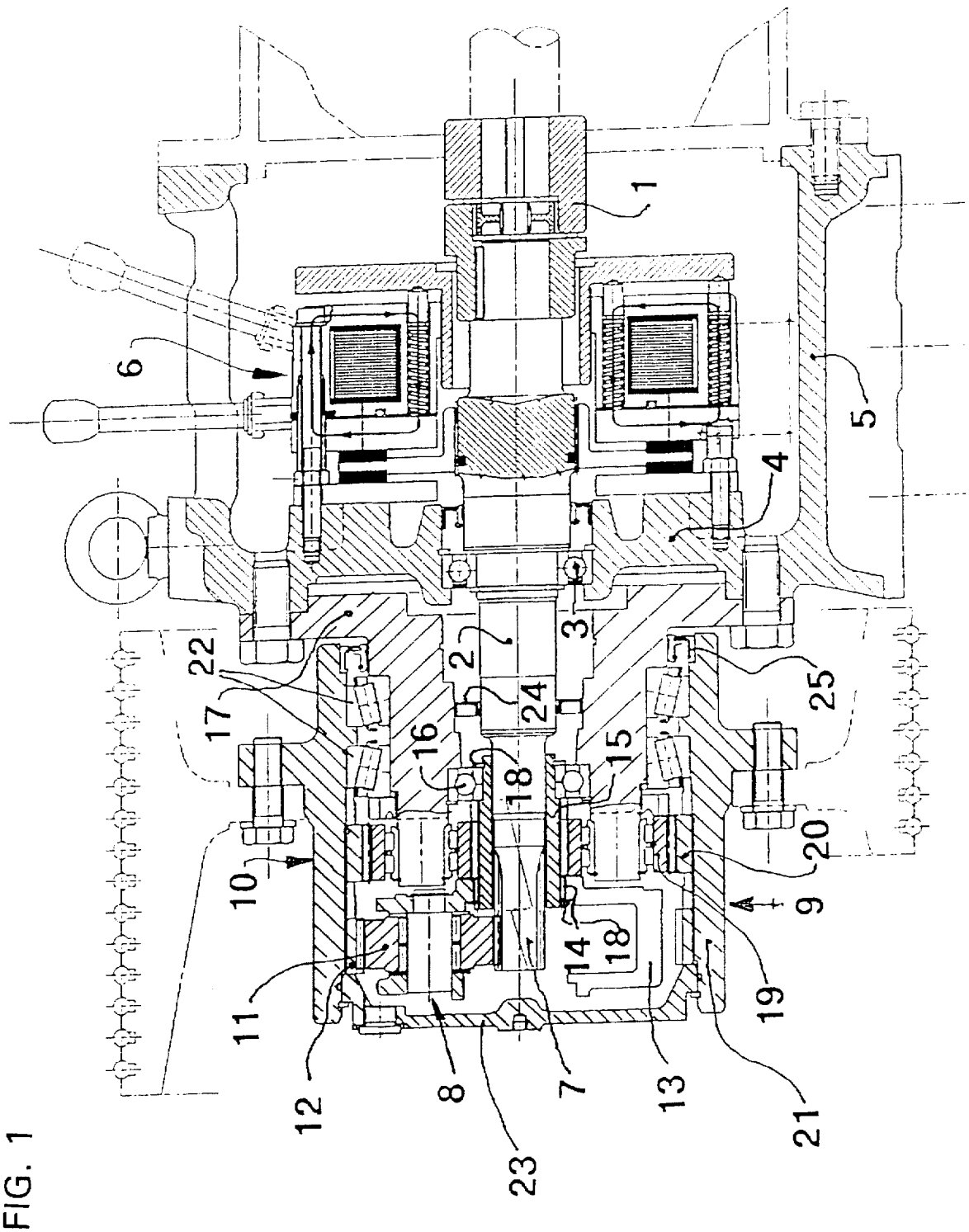

United States Patent

Mann et al.

[11] Patent Number: 5,779,588
[45] Date of Patent: Jul. 14, 1998

[54] DRIVE FOR LIFTING EQUIPMENT

[75] Inventors: Egon Mann, Friedrichshafen; Erwin Meisinger, Hauzenberg, both of Germany

[73] Assignee: ZF Friedrichshafen AG, Friedrichshafen, Germany

[21] Appl. No.: 656,180
[22] PCT Filed: Sep. 30, 1995
[86] PCT No.: PCT/EP95/03879
 § 371 Date: Jul. 10, 1996
 § 102(e) Date: Jul. 10, 1996
[87] PCT Pub. No.: WO96/11161
 PCT Pub. Date: Apr. 18, 1996

[30] Foreign Application Priority Data

Oct. 7, 1994 [DE] Germany ............ 44 35 849.0

[51] Int. Cl.⁶ ............................................. F16H 1/46
[52] U.S. Cl. ........................ 475/331; 475/348; 74/443
[58] Field of Search ................. 475/331, 348; 74/443

[56] References Cited

U.S. PATENT DOCUMENTS

| 1,786,158 | 12/1930 | Hawes | 475/331 X |
| 3,906,818 | 9/1975 | Benthake et al. | 475/348 X |
| 4,461,460 | 7/1984 | Telford . | |
| 4,656,890 | 4/1987 | Marquardt | 475/348 |

FOREIGN PATENT DOCUMENTS

| 30 31 836 | 4/1981 | Germany . |
| 38 40 281 | 5/1990 | Germany . |
| WO 89/11436 | 11/1989 | WIPO . |

OTHER PUBLICATIONS

"Mechanism and Dynamics of Machinery", Mabie&Reinholtz, p. 227, John Wiley&Sons Pub., 1987.

Primary Examiner—Khoi Q. Ta
Attorney, Agent, or Firm—Davis and Bujold

[57] ABSTRACT

The invention concerns a lifting equipment drive consisting of a drive motor, a brake (6) and a dual-stage planetary transmission (9). Both planetary gear sets (8, 10) have helical gearing. The sun gear (15) of the second planetary gear set (10) has a floating mounting in a hub carrier (17) or a hub (21, 23) via a bearing (16) which takes up axial and radial forces. The suggested set-up reduces the axial installation length. The sun gears (7, 15) of the planetary gear sets (8, 10) can adapt to various load ratios. The helical gearing of the planetary transmission (9) prevents low frequency vibrations which could be transmitted into the lift, particularly for long cable lengths, where they could be detected as a disturbing humming noise.

9 Claims, 2 Drawing Sheets

DRIVE FOR LIFTING EQUIPMENT

The invention concerns a lifting equipment drive including a motor which drives, via a two-stage planetary transmission, a rotary hub mounted on a fixed hub carrier. The planetary transmission's first planetary gear set has a driven sungear and a planetary gear carrier, which is rotary connected with a sun gear of the second planetary gear set and whose planetary gears are intermeshed with ring gears which rotate at the same speed.

In the field of lifting equipment, elevators are driven at relatively low speeds. Therefore, corresponding low speeds are necessary on the elevator drive's output shaft. Generally, reversed polarity electric motors are used which operate with an open loop control. The elevator is driven up to a short distance from the stop position before being dynamically slowed down until the stop position (exit point) is reached.

A lifting equipment drive constitutes a compact drive unit which can be both installed and maintained in the most restricted spaces.

A lifting equipment drive, as described in DE-A 38 40 281, is made up of independent units which can be disassembled as modular units. These consist of a planetary transmission with driving disc, a brake housing serving as a stator containing an emergency brake and of an electric motor.

In order to reduce noise emissions, the lifting equipment drive described in EP-A 0 442 882 has a planetary transmission whose input planetary gear set is helical cut whilst the second planetary gear set is straight cut. The input shaft is divided by a coupling between the sun gear of the input planetary gear set and the brake, installed between the electric motor and the planetary transmission. The portion of the shaft connected to the brake disc is mounted in a flange on the brake housing by means of a radial ball bearing. The other part of the input shaft which carries the sun gear is mounted with a further radial grooved ball bearing 33 in the planetary gear carrier (hub carrier) of the second planetary gear set. With this transmission, the fact that the input shaft is split into two can be seen as a disadvantage. This increases design and construction costs and the axial length of the drive unit.

In the field of drive technology, there is an increasing trend towards electric asynchronous motors, which are speed-variable due to a frequency rectifier. For lifting equipment applications, asynchronous motors operate within a speed range of approximately 1,500–2,600 rpm. This has the advantage that lift drive speeds of 0.6–2.5 m/sec can be achieved simply, i.e. without modifying transmission ratios.

Through the use of speed-variable asynchronous motors, speeds are achieved (e.g. 1,700–1,800 rpm) where low frequency vibrations occur, caused by the engagement frequency between the first and second planetary gear sets. These low frequency excitations and the harmonics create a humming noise in the lift by transmission of structure-born noise via air vibrations. These noises are felt to be very disturbing.

The fundamental task of the invention at hand, based on the state of technology as shown in the EP-A 0 442 882, is to further improve a lifting equipment drive, so that it is characterized by low design and construction costs, a reduced axial length and improved vibration or noise levels.

In accordance with the invention, the said task is solved by the sun gear being rotationally fixed to the free end of an input shaft, which is attached to the bearing of a fixed flange, and furthermore by the helical cut sun gear attached by a floating mounting to the hub carrier or the hub via a bearing which absorbs axial and radial forces.

The solution based on the invention can be executed with at least two different types of design. In the first design, the drive of the first planetary gear set is achieved via a longer input shaft and a helically cut second planetary gear set, which serves as a stationary transmission. The second design involves developing the drive using a shorter input shaft and another helically cut second planetary gear set which serves as epicyclic gear transmission. An undivided input shaft, which has a pivot mounting in a brake housing flange, is common to both versions. So that the sun gears of the first and second planetary gear sets can engage under any load, the two sun gears are mounted in a floating arrangement.

In the first design example, the hub has a pivot mounting with two taper roller bearings on a fixed hub carrier. The ring gears on both planetary gear sets are rotationally-fixed to the hub.

In the second design, the two planetary gear sets serve as epicyclic gear transmissions. Their ring gears are held rigidly in the fixed hub carrier, thereby reducing expenditure for mounting. The hub has a pivot mounting in relation to the hub carrier, with two taper roller bearings which are separated by a relatively large distance.

As the input shaft is mounted between the sun gear and a brake in the flange of a brake housing, the drive of the first planetary gear set is achieved via an undivided input shaft which reduces bearing costs. The sun gear of the first planetary gear set can still be engaged under any load though due to the floating arrangement.

The methods for attaching the sun gear and the planetary gear carrier to the bearing comprise retaining rings or axial thrust washers (preferable) or similar machine components and/or design methods. Particularly at higher loads, a rotationally fixed mounting of the ring gears in the hub carrier can lead to a compact constructions method.

To be able to use relatively smaller bearings despite higher performance, it is preferably if the hub is attached on both sides (in relation to its longitudinal cross-section) to the hub carrier using bearings, preferably taper roller bearings. In this case, the arrangement is one bearing with its inner ring in the hub and the other with its inner ring in the fixed hub carrier.

To avoid disturbing engagement frequencies and resulting harmonic waves, it is preferably to choose a meshing ratio (ratio of number of teeth between first and second planetary gear sets) that is not an integer.

When trying either to avoid a certain resonance ratio or to achieve an odd resonance ratio, it is an advantage to equip each planetary gear set with four planetary gears which all engage simultaneously. It is possible to influence the engagement frequency to a certain extent through the engagement sequence. Harmonic waves are avoided by increasing the overlap of the meshing gears. For this reason also, helical cutting of both planetary gear sets proves to be a great advantage.

Other fundamental characteristics of the invention and their resulting advantages are given in the following description of the two design examples for the invention.

Figure 2:
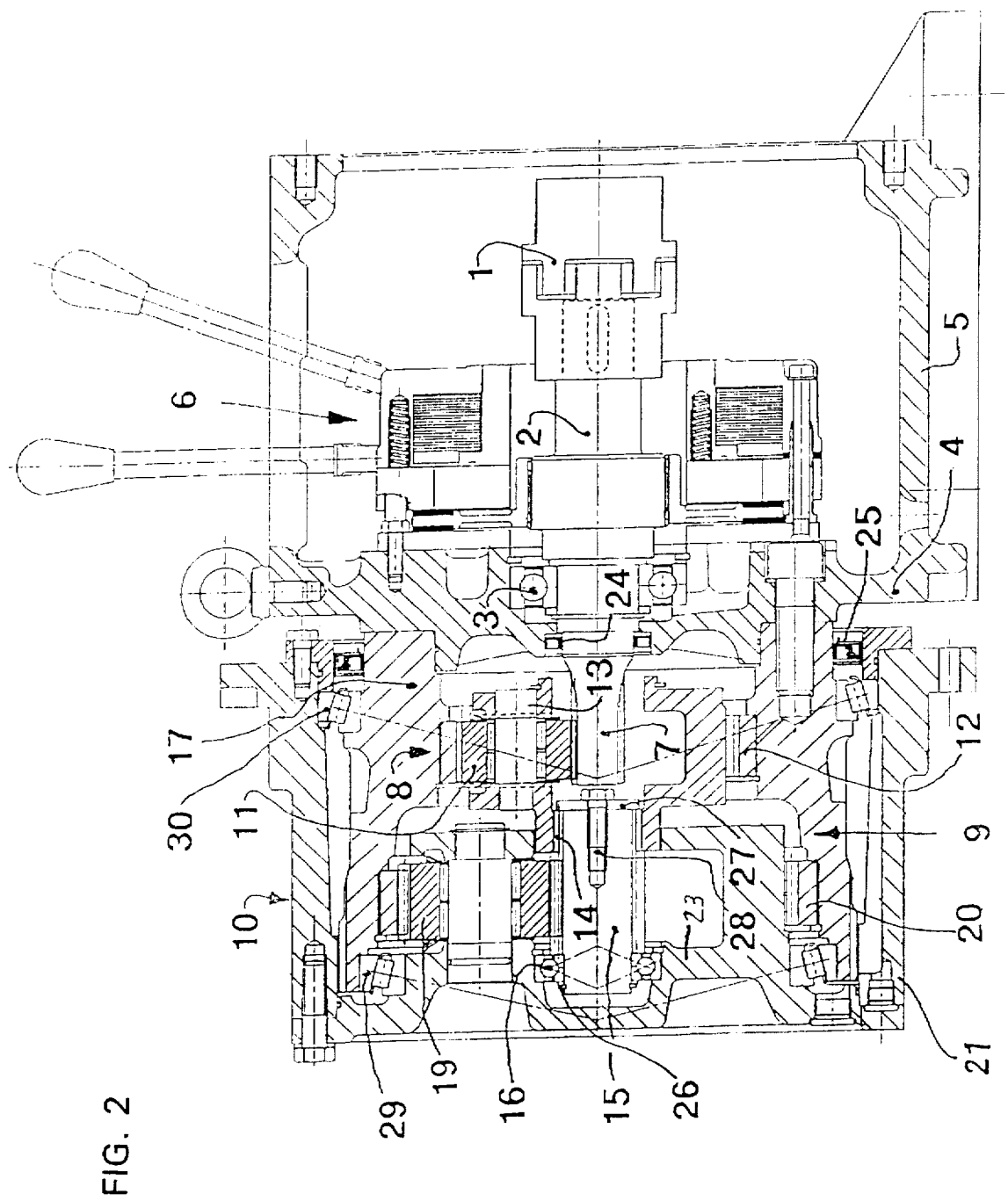

FIG. 1 a design example of a lifting equipment drive, with a dual-stage planetary drive, where the second step serves as a stationary transmission; and FIG. 2 another design example for a lifting equipment drive, also with a dual-stage planetary drive where both planetary gear sets serve as an epicyclic gear transmission.

FIG. 1 shows a longitudinal cross-section of one lifting equipment drive. A drive motor, preferably a speed-variable asynchronous motor (not illustrated), drives a coupling (1) via input shaft (2).

Input shaft (2) is fairly centrally mounted (in relation to its lineal extension) via a single bearing (3), for example a grooved ball bearing, in a flange (4) of a brake housing (5) and is rotational. The brake housing (5) contains a safety brake (6) of a known electromagnetic design. Operation of a brake of this type is explained in more detail in an EP 0 442 882 B1.

The input shaft (2) has a helical cut gearing on its free end (left side in the diagram), which constitutes a sun gear (7) of a first planetary gear set (8) of a planetary drive (9). The planetary drive (9) is supplemented by a second planetary gear set (10).

Together with the sun gear (7) there are four planet gears (11) altogether in mesh engagement. The planetary gears (11) are furthermore engaged with an inside-toothed ring gear (12).

An annular and helically-cut section of a spider (13) of the first planetary gear set (8) engages a helical cut of a sun gear (14) of the second planetary gear set (10). The sun gear (15) is designed as a follow shaft. To guide the sun gear (15) (inner gear) and to support the axial force experienced, a fixed bearing, preferably a four-point bearing (16), is provided so that the sun gear (15) can be rotationally mounted provided so that the sun gear (15) can be rotationally mounted on one side (floating) to a locally fixed hub carrier (17). The hub carrier (17) is bolted together with the brake housing (5). The axial forces which exist in both rotational directions (upward and downward journeys) are partly absorbed by the four-point bearing. In addition to this, the ridge (13) and the four-point bearing (16) as well as the helical gearing of the sun gear (15) are interlocked with one another by a safety device (18), preferably a retaining ring.

The hub carrier (17) also serves as a carrier for the planetary gears (19) of the second planetary gear set (10). The planetary gears (19), of which there are four altogether, mesh both with the helical gearing of the sun gear (15) and with an annular and helically-cut ring gear (20) which, like the ring gear (12), has a fixed connection with a hub (21) of the lifting equipment drive.

The hub (21) is rotary arranged on the hub carrier (17) via two similar taper roller bearings (22).

The hub (21) can itself serve as a cable pulley. In this case, it is fitted with a mounting flange onto which cable pulleys of different sizes can be screwed as an option.

The hub (21) is closed and sealed by a cover (23). Further radial shaft seals (24) and (25) prevent any leaking of transmission oil from the inner chamber of hub (21).

FIG. 2 depicts a longitudinal view/cross-section of another design variant for a lifting equipment drive, with a modified design. As the designs shown in FIGS. 1 and 2 are basically identical, the same components are given the same reference numbers in the following description. The input shaft 2 is shorter in the design shown in FIG. 2. The method of bearing is still via bearing (3) in flange (4) of the brake housing (5). The sun gear (7) is permanently in mesh with the planets (11) of the first planetary gear set. The planets (11) are meshed with the ring gear (12). The ring gear (12) is held tight in hub carrier (17).

The annular and helical gear section (14) of the rotating spider (13) of the first planetary gear set (8) engages with the outer helical gearing of the sun gear (15) of the second planetary gear set (10). The planetary carrier (13), the helical gearing of the sun gear (15) and the four-point bearing (16) are again interlocked with each other in an axial direction. The securing devices are a retaining snap ring (26) and a thrust washer (27). The thrust washer (27) is bolted to the sun gear (15) by a central bolt (28).

In contrast to the design in FIG. 1, the four-point bearing (16) is housed in a recess of the cover (23) on the drive hub (21) of the lifting equipment drive. A further retaining ring secures the four-point bearing (16) to the cover (23).

The helical sun gear (15) is constantly in mesh with the planetary gears (19) of the second planetary gear set (10) of planetary transmission (9). The ring gear (20) is, like ring gear (12), fixed in position in the hub carrier (17). The hub (21) is mounted via a first taper roller bearing (29) which is inserted between cover (23) and hub carrier (17), and also a second taper roller bearing (30), located between hub (21) and hub carrier (17). The relatively large axial gap between the taper roller bearings (29) and (30) creates a favorable amount of load-support, so that taper roller bearings with a relatively low load capacity can be selected.

Radial shaft seals (24) and (25) are used for sealing the inner chamber of hub (21).

In the design version shown in FIG. 1, the first planetary gear set serves as an epicyclic gear, whilst the second planetary gear set is constituted by a stationary transmission. The ring gears on both planetary gear sets rotate and are rotationally fixed on hub (21). The sun gear is designed as a hollow shaft and is supported on one side (floating) by a fixed bearing in the form of a four-point bearing (16) in hub carrier (17). The axial forces resulting from the helical gearing are absorbed by the four-point bearing (16) and the taper roller bearing (22). The four-point bearing (16) takes up additional forces acting in a radial direction.

In the design shown in FIG. 2, the ring gears (12) and (20) on the first and second planetary gear sets are fixed in hub carrier (17). Both spider (13) of the first planetary gear set and the spider (cover 23) of the second planetary gear set rotate. The four-point bearing (16), with which the sun gear (15) of the second planetary gear set is fixed, is set in the rotary cover (23).

A common feature to the designs for the lifting equipment drive described above is the helical gearing on both planetary gear sets of the planetary transmission. The tuning ratio between the first and second planetary gear sets is not integral, so that there is no definite resonance ratio or frequency harmonization. The engagement sequence of the four planets on each planetary gear set is simultaneous so that disturbing engagement frequencies as well as interfering harmonic waves can be avoided by an increased overlap (approximately 2.6) of the helically-cut gears which intermesh. The sun gear of the second planetary gear set has a floating mounting just as the sun gear of the first set has, so that it can adapt very efficiently to the load ratios. Affixing the sun gear of the second planetary gear set is particularly straightforward, via a fixed bearing, preferably a four-point bearing. In transmission depicted and described above, low frequency resonance is avoided consistently. This eliminates the occurrence of low frequency vibrations, which could be transmitted into the elevator, particularly for long cable lengths, where they could be detected as a disturbing humming noise.

| Reference numbers | |
|---|---|
| 1 coupling | 15 sun gear |
| 2 input shaft | 16 four-point bearing |
| 3 bearing | 17 hub carrier |
| 4 flange | 18 safety device |
| 5 brake housing | 19 planetary gear |

-continued

| Reference numbers | |
|---|---|
| 6 brake | 20 ring gear |
| 7 sun gear | 21 hub |
| 8 first planetary gear set | 22 taper roller bearing |
| | 23 cover |
| 9 planetary transmission | 24 radial shaft seal |
| 10 second planetary gear set | 25 radial shaft seal |
| | 26 retaining ring |
| 11 planetary gear | 27 thrust washer |
| 12 ring gear | 28 central bolt |
| 13 spider | 29 taper roller bearing |
| 14 section | 30 taper roller bearing |

Wherefore, we claim:

1. An elevator drive device, comprising:

a rotary hub (21) mounted on a fixed hub carrier; and a motor in driving communication with a dual stage planetary transmission, which in turn drives said rotary hub, said dual stage planetary transmission (9) having a first (8) and a second (10) helically cut planetary gear set, wherein said first planetary gear set (8) has a helically cut driven sun gear (7) floatingly mounted in said hub carrier by a bearing which absorbs axial and radial forces and rotationally fixed to a free end of an input shaft (2) attached to a bearing (3) of a fixed flange (4), and a planetary gear carrier (13) which is rotationally fixed with a sun gear (15) of said second helically cut planetary gear set (10) whose planetary gears (11, 19) intermesh with ring gears (12, 20) wherein the meshing ratio between said first and second planetary gear sets (8, 10) is not an integer.

2. The drive device according to claim 1, wherein said input shaft (2) is mounted between said sun gear (7) and a brake (6) in a flange (4) of a brake housing (5).

3. The drive device according to claim 1, wherein devices (18, 26, 27, 28) secure said sun gear (15) and said planetary gear carrier (13) to said bearing (16).

4. The drive device according to claim 1, wherein said ring gears (12, 20) are rotationally fixed in said hub carrier (17).

5. The drive device according to claim 1, wherein said hub (21) is mounted on both sides, in relation to its longitudinal cross-section, on said hub carrier (17) using bearings (29, 30).

6. The drive device according to claim 5, wherein a first bearing (29) is set in said hub (21, 23) with an inner ring, and a second bearing (30) is set with an inner ring on said hub carrier (17).

7. The drive device according to claim 10, wherein said first and second planetary gear sets (8, 10) each have four planetary gears (11, 19) which engage simultaneously.

8. The drive device according to claim 1, wherein said meshing ratio is a cardinal number 2.2.

9. The drive device according to claim 7, wherein said meshing ratio is a cardinal number 2.2.

* * * * *